Sept. 23, 1969      J. MERCIER      3,468,126

POSITION CONTROL SYSTEM

Filed March 18, 1968

INVENTOR.
JEAN MERCIER

BY

ATTORNEY

United States Patent Office 3,468,126
Patented Sept. 23, 1969

3,468,126
POSITION CONTROL SYSTEM
Jean Mercier, 501 Bloomfield Ave.,
Caldwell, N.J. 07006
Filed Mar. 18, 1968, Ser. No. 713,580
Claims priority, application France, Mar. 24, 1967,
100,158
Int. Cl. F15b 15/18, 13/16
U.S. Cl. 60—52                                   14 Claims

ABSTRACT OF THE DISCLOSURE

This invention relates to a hydraulic system for controlling the position of a movable member such as a rudder shaft, by either manual or electrical control means which automatically connects a high pressure source to operate the movable member and which, in the event of failure of the high pressure source, will permit operation of the movable member by the manual control means.

Figures 1, 2:
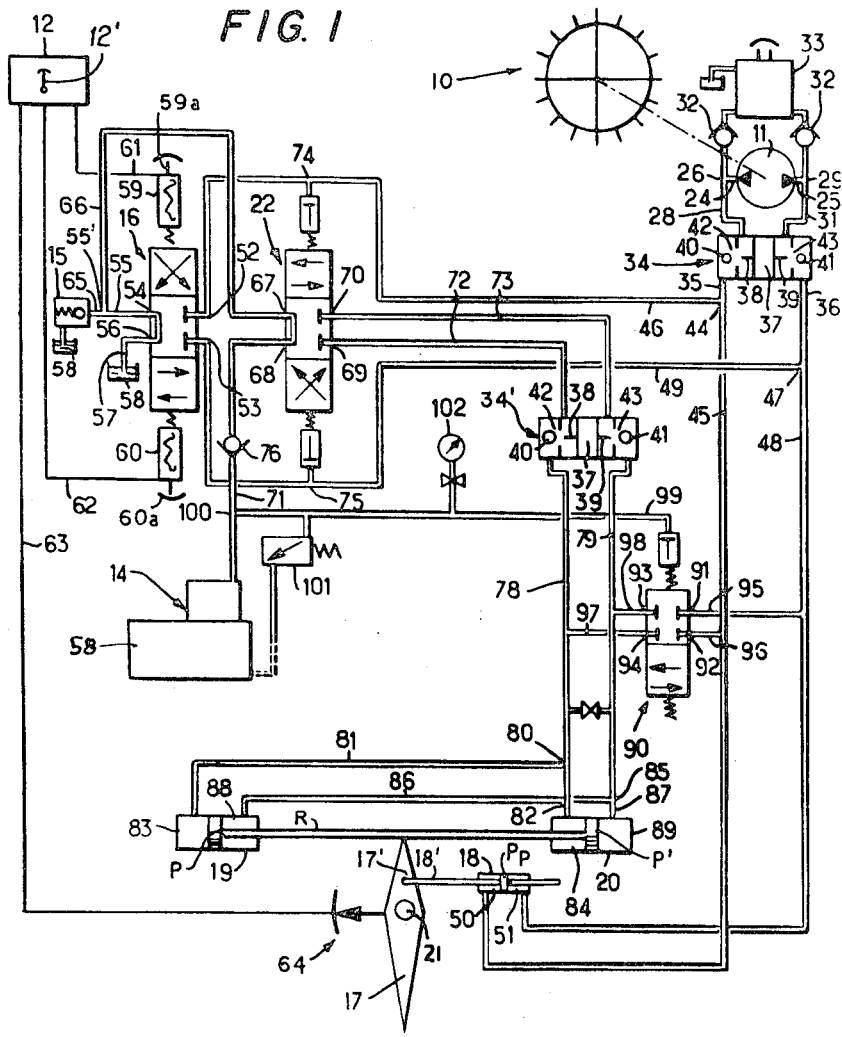

As conducive to an understanding of the invention, it is noted that where a movable member such as a device for controlling the direction of a ship, an aircraft or a ground vehicle, which is subject to vibration and shock in operation, is hydraulically actuated and it is desired to utilize either manual or electrical means to control said hydraulic actuator, if the system is complex in construction and utilizes delicate components, it is likely to become deranged in view of the nature of the equipment with which it is to be used.

It is accordingly among the objects of the invention to provide a hydraulic system for controlling the position of a movable member such as the rudder of a ship, which system is relatively simple in contsruction and has relatively few, sturdy components, not likely to become deranged even when the equipment with which it is utilized is subjected to vibration and shock, and which will permit manual control of the rudder which will be assisted by an auxiliary power source and which will also permit electrical control of the rudder by such auxiliary power source, and in the event of failure of such auxiliary power source will permit operation of the rudder solely by the manual control.

According to the invention these objects are accomplished by the arrangement and combination of elements hereinafter described and more particularly recited in the claims.

In the accompanying drawings in which is shown one of various possible embodiments of the several features of the invention, FIG. 1 is a diagrammatic view of the hydraulic control system, and FIG. 2 is a diagrammatic sectional view of a piloted double check valve utilized in the system.

Referring now to the drawings, the system comprises a bi-directional or reversible volumetric hydraulic pump 11 controlled by a manually operable member such as the steering wheel 10 of a vessel, for example.

The ports 24, 25 of the pump 11 are connected to junctions 26, 29 and thence through one-way valves 32 to a reservoir 33, the valves 32 permitting flow of fluid only from the reservoir to the ports 24, 25 of the pump.

The junctions 26, 29 are also connected through lines 28, 31 to a double check valve 34 which also has lines 35, 36 connected thereto.

The valve 34 which is of conventional type, is diagrammatically illustrated in FIG. 1 and shown in greater detail in FIG. 2, comprises a piston 37 carrying opposed push rods 38, 39 which control ball valves 40, 41 interposed respectively between lines 28, 35 and 31, 36.

When line 28 is under pressure, the fluid in such line will move the ball 40 to the left against the force of an associated coil spring 27 and will move the piston 37 to the right, the push rod 39 thus moving the ball 41 to the right against the force of an associated coil spring 30. As a result, the line 28 will be connected to line 35 and the line 31 will be connected to line 36. The same operation also occurs when the line 31 is under pressure.

If neither of the lines 28, 31 is under pressure and pressure is developed in lines 35 or 36, the ball valves 40, 41 will be urged against their associated seats defined by orifices 42, 43 respectively to close the lines 28, 31.

Thus, the valve 34 permits normal operation of pump 11, but will cut off access to the pump 11 when fluid under pressure is applied to lines 35, 36 from the remainder of the system as hereinafter described.

The line 35 is connected to junction 44 to which lines 45, 46 are connected and the line 36 is connected to junction 47 to which lines 48, 49 are connected.

The lines 45, 48 are connected respectively to chambers 50, 51 on opposed sides of the piston of pilot actuator 18, the piston rod 18' of which is pivotally connected to one side 17' of the lever 17 secured to the rudder shaft 21.

The lines 46, 49 are connected to junctions 74, 75 and to ports 52, 53 of pilot electro-valve 16. The valve 16 has two additional ports 54, 56, the former being connected to line 55 and the latter to line 57 leading into reservoir 58.

The valve 16 is of the three position type having a neutral position in which ports 52, 53 are closed and ports 54, 56 are connected; a first operating position when electro magnet 59 is energized in which ports 54, 53 and 52, 56 are connected and a second operating position when electro magnet 60 is energized in which ports 52, 54 and 53, 56 are connected.

The electromagnets 59, 60 are connected by leads 61 and 62 respectively to an automatic pilot 12 of conventional type which has a control handle 12' for direct operation of the electro valve 16 and which may have an input lead 63 connected to a position sensing device such as a potentiometer 64 controlled by the position of the rudder shaft 21. The potentiometer 64 cooperates in conventional manner with a potentiometer (not shown) controlled by handle 12' to provide a feedback action. As such feedback is conventional and per se forms no part of this invention, it will not be further described.

In the event of failure of the automatic pilot 12, or of the potentiometer, actuated by the control lever 12', or of the potentiometer 64, or the electro magnets 59, 60 of valve 16, manually operable push rods 59a, 60a are provided to actuate the valve 16.

The line 55 is connected to junction 55' to which lines 65 and 66 are connected. The line 65 is connected to reservoir 58 through one-way relief valve 15 which may be set to discharge fluid when the pressure attains a desired value and the line 66 is connected to port 67 of main hydrovalve 22. The relief valve 15 may be of any conventional type such as the loaded check valve, illustratively shown in FIG. 1, or it may be of the hydraulically or electrically controlled type which will permit reduction in the flow of fluid through the pilot valve 16 when the latter is in neutral position. The valve 22 is also a three-position valve similar to valve 16 and has additional ports 68, 69 and 70.

In the neutral position of valve 22, ports 69, 70 are closed and ports 67, 68 are connected. In the first operating position of valve 22, when fluid under pressure is applied through line 46 to junction 74, which is connected to one of the actuating ports of the valve 22, ports 68, 69 and ports 67, 70 are connected respectively. In the second operating position of valve 22 when fluid under pressure is applied through line 49 to junction 75, which is connected to the other actuating port of the valve 22, ports 67, 69 and ports 68, 70 are connected respectively.

A line 71 is connected from a high pressure source 14 of fluid under pressure to junction 100 and then through one-way valve 76 to port 68. Lines 72, 73 are connected to ports 69 and 70 of valve 22 and to a check valve 34' identical to valve 34, the valve 34' having lines 78, 79 connected thereto.

The lines 78, 79 are connected to junctions 80 and 85 respectively. Lines 81, 82 lead from junction 80 to chambers 83, 84 of main hydraulic actuators 19, 20. Lines 86, 87 lead from junction 85 to chambers 88, 89 of said actuators 19, 20. The pistons P, P' of said actuators are connected by a common piston rod R to the mid point of which the free end of side 17' of the lever 17 is pivotally connected.

A normally closed hydro-valve 90 serves to connect the piloting circuit defined by lines 45, 48 and the assisting circuit defined by lines 78, 79.

The valve 90 has four ports 91, 92, 93, 94. In the normally closed position of the valve 90 when line 99 connected to the actuating port of valve 90, which controls the latter and which is connected to junction 100, is under pressure, the ports 91, 92, 93, 94 are closed. When the pressure in line 99 drops below a predetermined amount, the ports 91, 93 and 92, 94 respectively are connected.

Associated with line 99 is a pressure gauge 102 and a high pressure relief valve 101 connected to the reservoir 58 of the high pressure source 14.

The ports 91, 92 of valve 90 are connected by lines 95, 96 to lines 48, 45 and the ports 93, 94 are connected by lines 98, 97 to lines 79, 78.

The system may be operated manually by steering wheel 10 or electrically by lever 12' of automatic pilot 12 or with pushbutton electric switching commonly used on many ships.

When the system is in its standby position, before the steering wheel 10 is rotated or lever 12' is moved, the high pressure fluid from source 14 will flow through line 71, one-way valve 76, ports 68, 67 of main valve 22, line 66, through ports 54, 56 of pilot valve 16 to reservoir 58 so that such flow is substantially unimpeded.

When the steering wheel 10 is rotated it will, for example, cause the pump 11 to force fluid under pressure from port 24, through line 28, orifice 42 of valve 34, lines 35, 45 into chamber 50 of pilot actuator 18.

Because of the resistance to rotation of the rudder shaft 21 and as port 52 of valve 16 is closed, the pressure in lines 45, 46 will build up so that junction 74 is placed under pressure. Thus, valve 22 will be moved to its first operating position to connect ports 68, 69 and 67, 70.

As a result, fluid under high pressure flows from source 14, line 71, ports 68, 69, line 72, through valve 34', lines 78, 81, 82 into chambers 83, 84 of actuators 19, 20. This will cause the rudder shaft 21 to rotate in a clockwise direction with corresponding movement of the piston $P_p$ of actuator 18 to the right so that the pressure in line 45 and hence in line 46 will drop. This will cause the pressure at junction 74 to drop so that valve 22 will move back to its neutral position.

As a result of such follow up action, it is apparent that as the wheel 10 is rotated, the rudder will move in incremental steps, each occurring only when the wheel 10 is rotated.

When the automatic pilot 12 is used, and the steering wheel and pump are not actuated, the energization of one of the electro-magnets, for example, the electro-magnet 60 by actuation of lever 12' will cause the high pressure fluid from source 14 to flow through line 71, ports 68, 67 of valve 22 which is in neutral position, line 66, through ports 54, 52 of valve 16 which are connected by reason of the energization of electro-magnet 60, to line 46 and thence through line 45 to chamber 50 of actuator 18.

Thus, as previously described, due to the resistance to rotation of the rudder shaft 21, the pressure in lines 45 and 46 will build up, such pressure being limited by the setting of loaded check valve 15. As a result, the junction 74 is placed under pressure sufficient to actuate valve 22 and the latter is moved to its first operating position. As previously described, ports 68, 69 will be connected so that the high pressure source 14 will be connected to chambers 83, 84 of actuators 19, 20 through valve 34' to rotate the rudder shaft 21 in a clockwise direction.

In order to provide for effective opening of main valve 22, an uninterrupted flow of fluid is required into the port 54 of pilot valve 16.

To this end communication must be established between the source of fluid under pressure 14 and one side of the main actuator as well as between the other side of the main actuator and the port 67 of main valve 22 before communication is cut off between ports 68 and 67 of said main valve 22. To avoid shocks and intermittent operation, the main valve 22 is of the known progressive operating type in which the edges of the slidable valve member or spool controlling the ports are formed with slots which progressively restrict communication with one port while progressively increasing communication with the other port.

It is to be noted that as valve 22 starts to open to connect ports 68, 69 to connect the high pressure source to the actuator to effect movement thereof, the flow of fluid through ports 68, 67 to pilot valve 16 and through connected ports 54, 52 will be decreased and the flow from pressure source 14 to the main actuator will be increased by the same amount; the outlet flow from the other side of the actuator effecting the necessary compensation.

It is to be noted that if the high pressure source 14 should fail, valve 90 will open and the lines 45, 48 from the manually operated pump 11 will be connected to lines 78, 79 to operate actuators 19, 20. Since there is pressure in lines 78, 79 from the pump 11, the ball valves 40, 41 of valve 34' will close orifices 42, 43 to cut off lines 72, 73. As a result, the failing portion of the system i.e., the high pressure source 14 will be cut off.

It is to be noted that the hydro-valve 90 can be replaced by an electrically operated valve or by a manually operated valve to permit manual operation of the system in an emergency.

It is also to be noted that when the electro valve 16 is in neutral position, there is a direct unrestricted return to the reservoir from the high pressure source so that heating of the hydraulic oil is at a minimum.

With the relatively simple system above described, the rudder shaft may be controlled in an assisted manner either manually or automatically.

As many changes could be made in the above system and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A hydraulic system comprising an actuator, a two-way main distributor valve having two operating ports connected to said actuator, a fluid pump connected to said main distributor valve for direction of the fluid therefrom to said operating ports, hydraulic means controlling said main valve, a pilot distributor valve controlling said hydraulic means and means providing a low pressure source of fluid into said pilot valve from the return flow from the actuator and/or the fluid pump.

2. The combination set forth in claim 1 in which the pilot distributor valve is manually actuated.

3. The combination set forth in claim 1 in which the pilot distributor valve is electrically operated.

4. The combination set forth in claim 1 in which the pilot distributor valve has a pair of normally connected ports, one of which is connected to the flow return line and the other one to a reservoir and a relief valve is connected into circuit with the flow return line before its connection to the pilot distributor valve.

5. A position control system for actuating a movable member comprising a pilot distributor valve having a normal neutral position and two operating positions, a hydraulically operated main distributor valve having actuating ports and having a normal neutral and two operating positions, a main source of fluid under relatively high pressure, said main valve having a pair of control ports operatively connected to the control ports of said main actuator and an additional pair of normally connected ports, means connecting said source of fluid under high pressure to one of said additional ports, a reservoir, a relief valve, said pilot valve having a pair of control ports operatively connected to the actuating ports of said main valve and an additional pair of normally connected ports, means connecting one of said additional ports directly to said reservoir, means connecting the other of said additional ports through said relief valve to said reservoir and to the other additional port of said main valve, and means connected to said pilot valve to move the latter from neutral position to either of its operating positions, whereby upon movement of said main valve to either of its operating positions, upon actuation of said pilot valve, fluid under pressure will be applied to said main hydraulic actuator to actuate said movable member.

6. The combination set forth in claim 5 in which the control ports of the main valve are normally closed.

7. The combination set forth in claim 6 in which the main valve is of the type incorporating means providing for progressive opening and closing of the ports during transition from the neutral position to either one of the operating positions.

8. A position control system for actuating a movable member comprising a reversible main hydraulic actuator operatively connected to said movable member and having a pair of control ports, a first source of fluid under pressure comprising a manually operable reversible pump having two fluid ports, an electrically operated pilot distributor valve having a normal neutral position and two operating positions, a hydraulically operated main distributor valve having actuating ports and having a normal neutral and two operating positions, a main source of fluid under relatively high pressure, conduits connecting the ports of said reversible pump to the actuating ports of said main valve to effect movement of said main valve from said neutral position to either of said operating positions upon buildup of pressure in said conduits upon actuation of said pump, said main valve having a pair of normally closed control ports operatively connected to the control ports of said main actuator and an additional pair of normally connected ports, means connecting said source of fluid under high pressure to one of said additional ports, a reservoir, a relief valve, said pilot valve having a pair of normally closed control ports operatively connected to the actuating ports of said main valve and an additional pair of normally connected ports, means connecting one of said additional ports directly to said reservoir, means connecting the other of said additional ports through said relief valve to said reservoir and to the other additional port of said main valve, and electrical means connected to said pilot valve to move the latter from neutral position to either of its operating positions, whereby upon movement of said main valve to either of its operating positions, upon actuation of said pump or upon energization of said pilot valve, fluid under pressure will be applied to said main hydraulic actuator to actuate said movable member.

9. The combination set forth in claim 8 in which a double check valve is connected between the control ports of said main valve and the control ports of said main actuator, said valve permitting flow of fluid therethrough only when the pressure of the fluid leading into the double check valve from either of the control ports of said main valve exceeds the pressure on the fluid into the double check valve from either of the control ports of the main actuator.

10. The combination set forth in claim 8 in which the relief valve is set to a value to permit flow therethrough only when the presure applied thereto has exceeded a value sufficient to operate said hydraulically operated main valve.

11. The combination set forth in claim 8 in which a pilot hydraulic actuator is operatively connected to said movable member to effect movement thereof in the same direction as said main hydraulic actuator when the latter is energized, said pilot actuator having a pair of control ports operatively connected to the ports of said reversible pump.

12. The combination set forth in claim 11 in which a double check valve is provided between said pump and said pilot actuator and said main valve, said double check valve permitting flow of fluid therethrough only when the pressure at either of the fluid ports of said pump exceeds the pressure at either of the control ports of said pilot actuator and the pressure at the actuating ports of said main valve.

13. The combination set forth in claim 8 in which conduits are provided to afford communication between the fluid ports of said pump and said control ports of said main hydraulic actuator, valve means are provided in said conduits normally to cut off flow therethrough, said valve means being hydraulically operated and a conduit is provided between said source of fluid under high pressure and said valve means to maintain said valve means in closed position so long as the high pressure source of fluid exceeds a predetermined value.

14. The combination set forth in claim 13 in which a double check valve is connected between the control ports of said main valve and the control ports of said main actuator, said valve permitting flow of fluid therethrough only when the pressure of the fluid leading into the double check valve from either of the control ports of said main valve exceeds the pressure on the fluid into the double check valve from either of the control ports of the main actuator, the conduits affording communication between the fluid ports of said pump, and the control ports of said main actuator are connected in the system between said double check valve and said main actuator to permit normal flow of fluid to said main actuator from said high pressure source when the latter has a value above a predetermined amount, said double check valve blocking flow of fluid from said manually operated pump to said high pressure system when the value of such high pressure system has fallen below a predetermined amount.

References Cited

UNITED STATES PATENTS

| | | | |
|---|---|---|---|
| 2,789,541 | 4/1957 | Gaspar et al. | 91—461 XR |
| 3,162,014 | 12/1964 | Mercier et al. | |
| 3,349,744 | 10/1967 | Mercier et al. | |

EDGAR W. GEOGHEGAN, Primary Examiner

U.S. Cl. X.R.

91—388, 420, 461; 114—150